Figure 1:
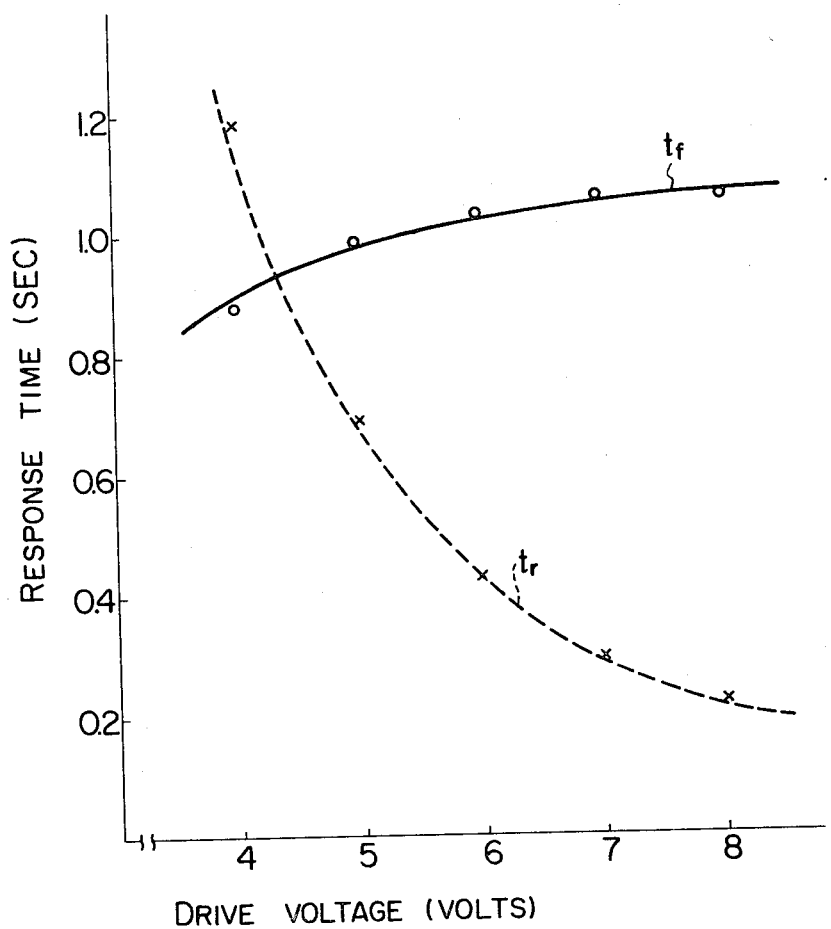

United States Patent [19]

Hasegawa et al.

[11] Patent Number: 4,464,283

[45] Date of Patent: Aug. 7, 1984

[54] LIQUID CRYSTAL COMPOSITION

[75] Inventors: Shinji Hasegawa; Kazuhisa Toriyama, both of Mobara, Japan; Ludwig Pohl, Darmstadt; Georg Weber, Erzhausen, both of Fed. Rep. of Germany

[73] Assignees: Hitachi, Ltd.; Merck Patent GmbH, both of Tokyo, Japan

[21] Appl. No.: 396,304

[22] Filed: Jul. 8, 1982

[30] Foreign Application Priority Data

Jul. 8, 1981 [JP] Japan ................. 56-105510

[51] Int. Cl.$^3$ ............................ C02F 1/13; C09K 3/34
[52] U.S. Cl. ............................ 252/299.63; 252/299.5; 350/350 R
[58] Field of Search ................. 252/299.5, 299.63; 350/350 R

[56] References Cited

U.S. PATENT DOCUMENTS

| | | | |
|---|---|---|---|
| 4,130,502 | 12/1978 | Eidenschink et al. | 252/299.63 |
| 4,154,697 | 5/1979 | Eidenschink et al. | 252/299.63 |
| 4,198,130 | 4/1980 | Boller et al. | 252/299.5 |
| 4,228,030 | 10/1980 | Cole, Jr. | 252/299.63 |
| 4,229,315 | 10/1980 | Krause et al. | 252/299.63 |
| 4,330,426 | 5/1982 | Eidenschink et al. | 252/299.63 |
| 4,331,552 | 5/1982 | Eidenschink et al. | 252/299.63 |

FOREIGN PATENT DOCUMENTS

| | | | |
|---|---|---|---|
| 54-99785 | 8/1979 | Japan | 252/299.63 |
| 56-2372 | 1/1981 | Japan | 252/299.63 |
| 56-118481 | 9/1981 | Japan | 252/299.63 |
| 57-18777 | 1/1982 | Japan | 252/299.63 |
| 57-18778 | 1/1982 | Japan | 252/299.63 |
| 57-21479 | 2/1982 | Japan | 252/299.63 |
| 57-34176 | 2/1982 | Japan | 252/299.63 |
| 2097418 | 11/1982 | United Kingdom | 252/299.63 |

*Primary Examiner*—Teddy S. Gron
*Attorney, Agent, or Firm*—Antonelli, Terry & Wands

[57] ABSTRACT

A liquid crystal composition comprising trans-4-n-propyl-(4-ethylphenyl)-cyclohexane, trans-4-n-pentyl-(4-cyanophenyl)-cyclohexane, trans-4-n-pentyl-(4'-ethylbiphenyl-4)cyclohexane, trans-4-n-pentyl-(4'-cyanobiphenyl-4)-cyclohexane, 4-n-propylphenyl-4-(trans-4-n-propylcyclohexyl)benzoate, and 4-(trans-4-n-pentyl-cyclohexyl)-4'-(trans-4-n-propylcyclohexyl)-biphenyl is drivable over a wide temperature range and can be operated rapidly at low temperatures.

6 Claims, 3 Drawing Figures

LIQUID CRYSTAL COMPOSITION

The present invention relates to a liquid crystal composition for use in a TN (twisted nematic) liquid crystal display element, and more particularly to a liquid crystal composition which is drivable over a wide temperature range and can be operated rapidly at low temperatures.

Because of their low operating voltage and extremely low power consumption, liquid crystal display elements are widely used in electronic calculators and wrist watches, and a rapid increase of the application of liquid crystals for various meters and display devices is observed recently. Moreover, as it is possible to construct a falt-panel display with a thickness of the order of 2 millimeters and visible at high ambient light levels, liquid crystal display elements are regarded as having a promising future in an application to automobile instrument panels.

Generally, requirements for the liquid crystal display element for automobile uses are that it should be operated over a wide temperature range of from $-30°$ to $+80°$ C. and that it should have high-speed responsiveness such as both rise time and fall time being 0.5 sec or less even at a temperature as low as $-30°$ C.

The rise time $t_r$ and the fall time $t_f$ are generally expressed by the following equations respectively:

$$t_r = \frac{\eta \cdot d^2}{\epsilon_0 \Delta \epsilon v^2 - k^2 \pi^2}$$

$$t_f = \frac{\eta \cdot d^2}{k \cdot \pi^2}$$

wherein $\eta$ is the viscosity of liquid crystal; d, the gap between the substrates; $\epsilon_0 \Delta \epsilon$, the dielectric constant of liquid crystal; v, the driving voltage to be applied to liquid crystal; k, the elastic constant, and $\pi$, the circular constant.

Figure 2:
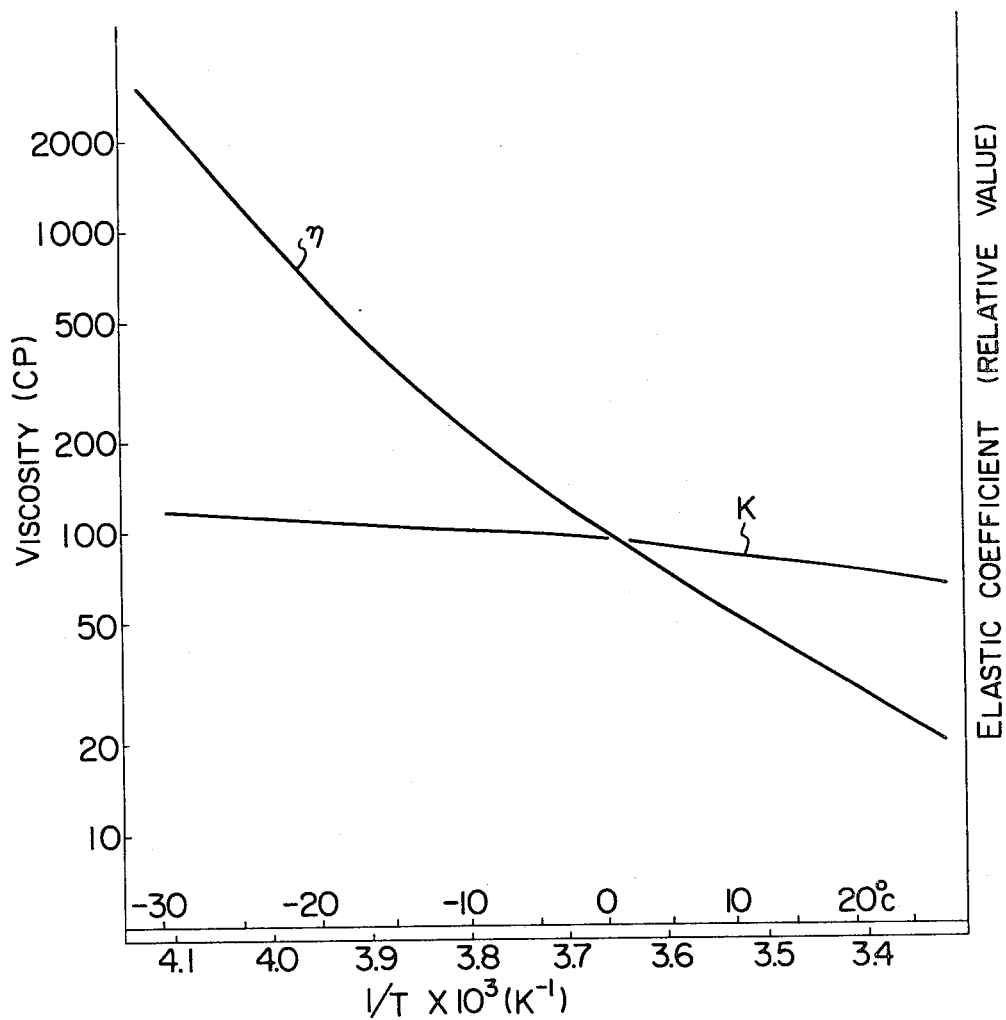

The rise time $t_r$ for liquid crystal can be thus controlled by the driving voltage v. However, the fall time $t_f$ is virtually constant irrespective of the driving voltage v. For example, the response time of liquid crystal ZLI-1132 available from Merck & Co., Inc. is dependent on the driving voltage as shown in FIG. 1 at $-20°$ C. when statically driven at 32 Hz. Supposing it is driven at 5 to 8 volts in FIG. 1, the fall time $t_f$ for the liquid crystal will be greater than the rise time $t_r$ by several times. It becomes important, therefore, to reduce the fall time $t_f$ in order to improve the response time of the liquid crystal for automobile uses. The fall time $t_f$ is, as indicated by the equation given above, proportional to the ratio of the viscosity $\eta$ to the elastic constant k, $\eta/k$. It should be noted, however, that the increase in the viscosity $\eta$ with a decrease in temperature is overwhelmingly greater than the increase in the elastic constant k with a decrease in temperature as shown in FIG. 2, thus the largeness of $\eta/k$ in the lower temperature region is almost determined by the viscosity $\eta$ only. It is therefore necessary to minimize the viscosity of the liquid crystal at lower temperatures as much as possible in order to reduce the fall time $t_f$ at lower temperature region.

On the other hand, the nematic-to-isotropic transition temperature (N - I point) of liquid crystal materials should be at least 80° C. or higher, and preferably 85° C. or higher in order to operate the liquid crystal display element at a temperature as high as $+80°$ C. Supposing a mixture of liquid crystals is a regular solution, N - I point ($T_{NI}$) of the liquid crystal mixture will be expressed by the following equation:

$$T_{NI} = \sum_i T_i \cdot x_i$$

wherein $T_i$ is a N - I point of the component i and $x_i$ is a mole fraction. Thus, it is relatively easy to raise the N - I point of the mixed liquid crystals. However, because of the correlation between N - I point of a liquid crystal and its viscosity $\eta$, the viscosity $\eta$ generally tends to rise correspondingly with the rise of N - I point and vice versa. This has made it extremely difficult to maintain a high N - I point and a low viscosity at the same time in a liquid crystal composition.

Even some of relatively less viscous liquid crystal materials heretofore available in the market or as a sample which had N - I point of more than 80° C. had the viscosity of 200 CP or more at 0° C., and 2000 CP or more at $-20°$ C. This brought about the fall time $t_f$ of 2 seconds or more at $-20°$ C. Generally speaking, it is necessary that the viscosity should at least be 50 to 60 CP or less at 0° C., and 300 CP or less, preferably 200 CP or less at $-20°$ C. in order to make both the rise time and fall time 0.5 sec or less at $-30°$ C.

Presently there exists no liquid crystal composition of which N - I point is 80° C. or higher while C - N (crystal-to-nematic) point is $-30°$ C. or lower. The C - N point of multi-component liquid crystal mixture is usually in the range of about $-15°$ to $-10°$ C. A reason why the liquid crystal mixture is operative at low temperatures of $-20°$ C. to $-30°$ C. is because the nematic phase can be present in super-cooling state, and the stability of this super-cooling state varies dependent on components and composition of the mixed liquid crystals. The liquid crystal materials for automobile uses should be maintained in this super-cooling state at $-30°$ C. for a long period of time in order to ensure display operations at temperatures as low as $-30°$ C.

As above described, the liquid crystal materials for automobile uses should satisfy the following requirements in order to cover the wide operating temperature range of between $-30°$ C. to $+80°$ C. and to realize quick response of 0.5 sec or less at $-30°$ C.

(1) The N - I point should be 80° C. or higher, and preferably 85° C. or higher.

(2) The nematic phase in super-cooling should be stably maintained for a long period of time at $-30°$ C.

(3) The viscosity should be 50 to 60 CP or less at 0° C., 300 CP or less and preferably 200 CP or less at $-30°$ C.

However, no liquid crystal composition which has the above features has heretofore been available.

It is, therefore, an object of the present invention to provide a liquid crystal composition which satisfies the requirements mentioned above.

The present invention provides a liquid crystal composition comprising trans-4-n-propyl-(4-ethylphenyl)-cyclohexane, trans-4-n-pentyl-(4-cyanophenyl)-cyclohexane, trans-4-n-pentyl-(4'-ethylbiphenyl-4)-cyclohexane, trans-4-n-pentyl-(4'-cyanobiphenyl-4)-cyclohexane, 4-n-propylphenyl-4-(trans-4-n-propylcyclohexyl) benzoate, and 4-(trans-4-n-pentylcyclohexyl)-4'-(trans-4-n-propylcyclohexyl)-biphenyl.

Figure 3:
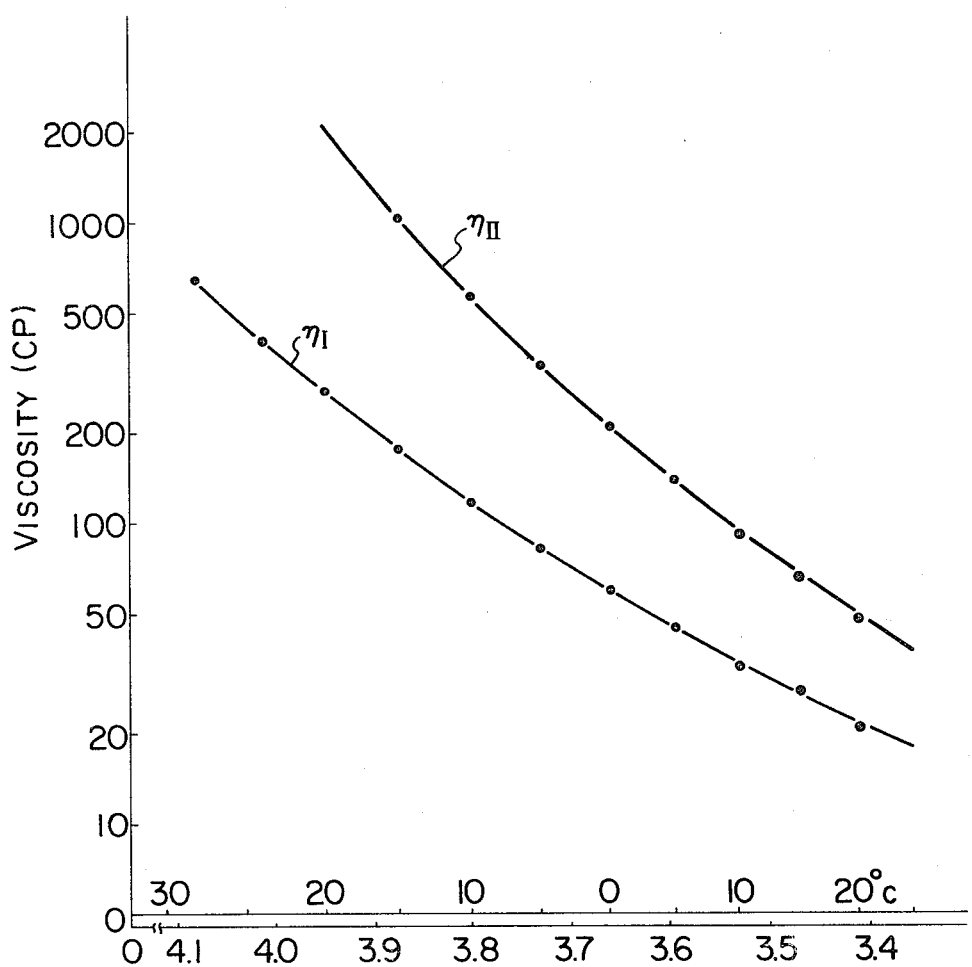

In the attached drawings,

FIG. 1 is a graph showing the dependence of rise and fall response times of a TN liquid crystal display element on the driving voltage, FIG. 2 is a graph showing a general tendency in the temperature dependence of the viscosity and elastic constant of liquid crystals, and FIG. 3 shows the temperature dependence of the viscosity of the liquid crystal composition according to the present invention.

The liquid crystal composition of the present invention satisfies the requirements (1) through (3) stated above.

The liquid crystal composition according to the present invention exhibits its properties most effectively when the components thereof are in the following range; 29–36 mole % of trans-4-n-propyl-(4-ethylphenyl)-cyclohexane (hereinafter referred to as PCH 32), 28 to 35 mole % of trans-4-n-pentyl-(4-cyanophenyl)-cyclohexane (hereinafter referred to as PCH 5), 14–18 mole % of trans-4-n-pentyl-(4'-ethylbiphenyl-4)-cyclohexane (hereinafter referred to as BCH 52), 4–7 mole % of trans-4-n-pentyl-(4'-cyanobiphenyl-4)-cyclohexane (hereinafter referred to as BCH 5), 3–7 mole % of 4-n-propylphenyl-4-(trans-4-n-propylcyclohexyl) benzoate (hereinafter referred to as HP 33), and 5–8 mole % of 4-(trans-4-n-pentylcyclohexyl)-4'-(trans-4-n-propylcyclohexyl)-biphenyl (hereinafter referred to as CBC 53).

The present invention is now explained in further detail referring to examples thereof.

EXAMPLE 1

A liquid crystal composition I comprising 32 mole % of PCH 32, 33 mole % of PCH 5, 16 mole % of BCH 52, 6 mole % of BCH 5, 6 mole % of HP 33, and 7 mole % of CBC 53 was prepared. The composition I was determined to have an N - I point of 86.5° C. by using FP 5 and FP 52 type meters manufactured by Mettler Company. The viscosity of the composition was then measured by using an EL-1500 type rotary viscometer manufactured by Tokyo Keiki K.K. The temperature dependence of the viscosity ($\eta_I$) of this composition is shown in FIG. 3. For comparison, the temperature dependence of the viscosity ($\eta_{II}$) of a liquid crystal composition having the following components is also shown in FIG. 3.

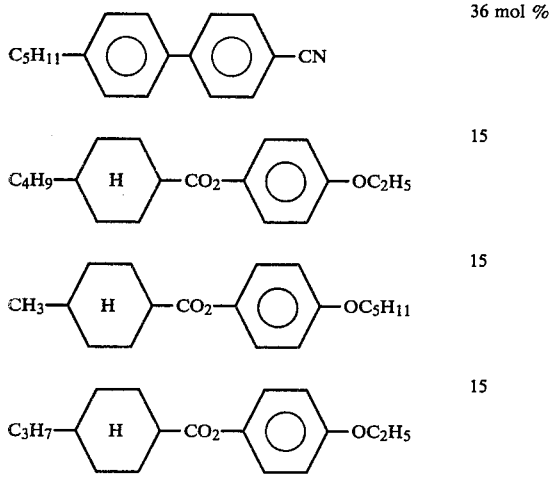

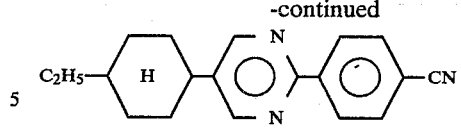

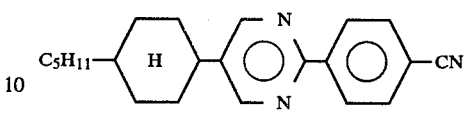

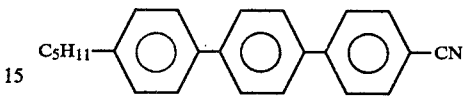

wherein $T_{NI} = 84°$ C.

As is clear from FIG. 3, the viscosity of the composition I is 59.5 CP at 0° C. and 274 CP at $-20°$ C., demonstrating that an uncomparably low viscosity is achieved.

The viscosity of a liquid crystal generally increases rapidly as the temperature is lowered, and the curve obtained by plotting logarythms of the viscosity against the reciprocals of the absolute temperature shows a steep gradient in the lower temperature regions. As can be seen from FIG. 3, the viscosity curve $\eta_I$ of the composition I is not only on the lower side of the viscosity curve $\eta_{II}$ of the Comparative Example, but its temperature gradient is smaller than that of the Comparative Example. Thus, the difference in viscosity between the composition I and the Comparative Example becomes larger when the temperature becomes lower. In fact, the viscosity $\eta_I$ of the composition I at 0° C. is about 0.294 time as small as the viscosity $\eta_{II}$ of the comparative example, while it is about 0.137 time as small as that of $\eta_{II}$ at $-20°$ C. Thus, the composition I of the present invention demonstrates superior effects as a low viscous material when the temperature becomes lower and lower. The composition I was subsequently sealed in a first cell with a gap d of 9.3 μm and in a second cell with a gap d of 7.0 μm, respectively, for measuring its electro-optical characteristics. A chiral substance was added to the said composition I for reducing the fall time for response at a concentration which would make the cholesteric pitch of the liquid crystal to be equal to 4 times the cell gap d. As a chiral substance, 4-(4-hexyloxybenzoyloxy)-benzoic acid-d-2-octyl ester was used. When statically drived at 32 Hz and 6 V, the rise time and the fall time at $-30°$ C. for the first cell were 0.54 second and 0.88 second respectively, while the rise time and the fall time for the second cell were 0.33 sec and 0.50 sec., respectively. The first and the second cells were left standing at $-30°$ C., but no crystallization occurred after one month and they were confirmed to operate normally.

EXAMPLE 2

A liquid composition II comprising 36 mole % of PCH 32, 29 mole % of PCH 5, 14.5 mole % of BCH 52, 4.5 mole % of BCH 5, 5 mole % of HP 33, and 8 mole % of CBC 53 was prepared. The N - I point of this composition was 81.4° C., and its viscosity was 57 CP at 0° C. and 264 CP at $-20°$ C. After adding the chiral substance to the composition II as in Example 1 at a concentration which would make the cholesteric pitch of the liquid crystal to become equal to 4 times the cell gap d, the composition was sealed in a 3rd cell having a gap d of 7.2 μm between the substrates. When statically drived at 32 Hz and 6 V, the rise time at −30° C. was 0.23 sec and the fall time was 0.49 sec. The third cell was likewise left standing at −30° C. and was found to cause no crystallization after one month and to operate normally.

EXAMPLE 3

A liquid composition III comprising 36 mole % of PCH 32, 29 mole % of PCH 5, 17 mole % of BCH 52, 5.5 mole % of BCH 5, 5 mole % of HP 33, and 7.5 mole % of CBC 53 was prepared. The N-I point of the composition III was 83° C. and its viscosity was 56 CP at 0° C. and 259 CP at −20° C. After addition of the chiral substance to the composition III similarly as in Example 1, the composition was sealed respectively in a 4th cell and a 5th cell having gaps d of 8.0 μm and 6.8 μm, respectively, between the substrates. When statically drived at 32 Hz and 6 V, the rise time and the fall time at −30° C. for the 4th cell were 0.38 sec. and 0.46 sec., respectively. These 4th and 5th cells were also left standing for one month at −30° C. and further for one week at −40° C. No crystallization was observed and they were operated normally after the test.

EXAMPLE 4

A liquid crystal composition IV comprising 30.5 mole % of PCH 32, 35 mole % of PCH 5, 18 mole % of BCH 52, 6.5 mole % of BCH 5, 3.5 mole % of HP 33 and 6.5 mole % of CBC 53 was prepared. The composition IV had the N - I point of 86.0° C., the viscosity of 60 CP at 0° C. and 295 CP at −20° C. After adding the chiral substance to the composition IV similarly as in Example 1, the composition was sealed in a 6th cell having a gap d of 6.7 μm. When statically drived at 32 Hz and 6 V, the rise time and the fall time at −30° C. for the cell were 0.34 sec. and 0.50 sec. respectively. The 6th cell was left standing at −30° C., but no crystallization was observed after one month and it was confirmed to operate normally after the test.

EXAMPLE 5

A liquid crystal composition V comprising 32 mole % of PCH 32, 34 mole % of PCH 5, 18 mole % of BCH 52, 7 mole % of BCH 5, 4 mole % of HP 33, and 5 mole % of CBC 53 was prepared. The composition V had the N - I point of 82.1° C., the viscosity of 59 CP at 0° C., and 280 CP at −20° C. After adding the chiral substance to the composition V similarly as in Example 1, the composition was sealed in a 7th cell having a gap d of 6.7 μm. When statically drived at 32 Hz and 6 V, the rise time and the fall time at −30° C. were 0.33 sec and 0.48 sec., respectively. The cell was left standing at −30° C., but no crystallization occurred after one month and it was confirmed to operate normally after the test.

EXAMPLE 6

A liquid crystal composition VI comprising 31 mole % of PCH 32, 29 mole % of PCH 5, 20 mole % of BCH 52, 6 mole % of BCH 5, 6 mole % of HP 33, and 8 mole % of CBC 53 was prepared. The composition VI had a high N - I point of 95.6° C., and an extremely high voscisity of 72 CP at 0° C. and 415 CP at −20° C., respectively, compared with the compositions I–V. After adding the chiral substance to the composition VI similarly as in example 1, the composition was sealed in a 8th cell having a gap d of 8 μm. When statically drived at 32 Hz and 6 V, the rise time and the fall time at −30° C. were 0.75 sec and 1.3 sec., respectively. When the cell was left standing at −30° C., crystallization occurred in a part of a cell after about one week and it was not capable of conducting a normal operation. The crystallized portion regained its normal state when returned to room temperature. The composition VI with such properties had a high N - I point and a high viscosity, so that its response speed was slow and the stability of the nematic phase in the super-cooling state was not so good.

Other liquid crystal compositions according to the present invention than those mentioned in the above Examples were also studied. There were those crystallized when allowed to stand at −30° C. like the composition VI and those not crystallized like the compositions I to V. The compositions which were crystallized at −30° C. after allowed to stand contained PCH 32 and PCH 5 in a total amount of 62 mole % or less, while those which were not crystallized contained PCH 32 and PCH 5 in a total amount of 64 mole % or more. Accordingly, if it is desired to prevent crystallization at −30° C. in the composition VI, the sum of PCH 32 and PCH 5 contained therein should be 64 mole % or more.

As explained above, the liquid crystal composition according to the present invention enables the use over a wide operation temperature range of −30° C. to +80° C., and a quick response of 0.5 second or less at −30° C., thereby achieving the most excellent advantages of realizing the liquid crystal display elements of high quality and reliability as an instruments panel for automobiles.

What is claimed is:

1. A liquid crystal composition comprising
   29 to 36 mole % of trans-4-n-propyl-(4-ethylphenyl)-cyclohexane,
   28 to 35 mole % of trans-4-n-pentyl-(4-cyanophenyl)-cyclohexane,
   14 to 18 mole % trans-4-n-pentyl-(4'-ethylbiphenyl-4)-cyclohexane,
   4 to 7 mole % of trans-4-n-pentyl-(4'-cyanobiphenyl-4)-cyclohexane,
   3 to 7 mole % of 4-n-propylphenyl-4-(trans-4-n-propylcyclohexyl) benzoate, and
   5 to 8 mole % of 4-(trans-4-n-pentylcyclohexyl)-4'-(trans-4-n-propylcyclohexyl) -biphenyl;
   the total amount of trans-4-n-propyl-(4-ethylphenyl)-cyclohexane and trans-4-n-pentyl-(4-cyanophenyl)-cyclohexane being 64 mole % or more.

2. A liquid crystal composition comprising
   32 mole % of trans-4-n-propyl-(4-ethylphenyl)-cyclohexane,
   33 mole % of trans-4-n-pentyl-(4-cyanophenyl)-cyclohexane,
   16 mole % of trans-4-n-pentyl-(4'-ethylbiphenyl-4)-cyclohexane,
   6 mole % of trans-4-n-pentyl-(4'-cyanobiphenyl-4)-cyclohexane,
   6 mole % of 4-n-propylphenyl-4-(trans-4-n-propylcyclohexyl) benzoate, and
   7 mole % of 4-(trans-4-n-pentylcyclohexyl)-4'-(trans-4-n-propylcyclohexyl)-biphenyl.

3. A liquid crystal composition comprising
   36 mole % of trans-4-n-propyl-(4-ethylphenyl)-cyclohexane,
   29 mole % of trans-4-n-pentyl-(4-cyanophenyl)-cyclohexane, 14.5 mole % of trans-4-n-pentyl-(4'-ethylbiphenyl-4)-cyclohexane, 4.5 mole % of trans-4-n-pentyl-(4'-cyanobiphenyl-4)-cyclohexane, 5 mole % of 4-n-propylphenyl-4-(trans-4-n-propylcyclohexyl) benzoate, and 8 mole % of 4-(trans-4-n-pentylcyclohexyl)-4'-(trans-4-n-propylcyclohexyl)-biphenyl.

4. A liquid crystal composition comprising
36 mole % of trans-4-n-propyl-(4-ethylphenyl)-cyclohexane,
29 mole % of trans-4-n-pentyl-(4-cyanophenyl)-cyclohexane,
17 mole % of trans-4-n-pentyl-(4'-ethylbiphenyl-4)-cyclohexane,
5.5 mole % of trans-4-n-pentyl-(4'-cyanobiphenyl-4)-cyclohexane,
5 mole % of 4-n-propylphenyl-4-(trans-4-n-propylcyclohexyl) benzoate, and
7.5 mole % of 4-(trans-4-n-pentylcyclohexyl)-4'-(trans-4-n-propylcyclohexyl)-biphenyl.

5. A liquid crystal composition comprising
30.5 mole % of trans-4-n-propyl-(4-ethylphenyl)-cyclohexane,
35 mole % of trans-4-n-pentyl-(4-cyanophenyl)-cyclohexane,
18 mole % of trans-4-n-pentyl-(4'-ethylbiphenyl-4)-cyclohexane,
6.5 mole % of trans-4-n-pentyl-(4'-cyanobiphenyl-4)-cyclohexane,
35 mole % of 4-n-propylphenyl-4-(trans-4-n-propylcyclohexyl) benzoate, and
6.5 mole % of 4-(trans-4-n-pentylcyclohexyl)-4'-(trans-4-n-propylcyclohexyl)-biphenyl.

6. A liquid crystal composition comprising
32 mole % of trans-4-n-propyl-(4-ethylphenyl)-cyclohexane,
34 mole % of trans-4-n-pentyl-(4-cyanophenyl)-cyclohexane,
18 mole % of trans-4-n-pentyl-(4'-ethylbiphenyl-4)-cyclohexane,
7 mole % of trans-4-n-pentyl-(4'-cyanobiphenyl-4)-cyclohexane,
4 mole % of 4-n-propylphenyl-4-(trans-4-n-propylcyclohexyl) benzoate, and
5 mole % of 4-(trans-4-n-pentylcyclohexyl)-4'-(trans-4-n-propylcyclohexyl)-biphenyl.

* * * * *